INVENTOR.
Ole-Bendt Rasmussen

United States Patent Office 3,454,455
Patented July 8, 1969

3,454,455
APERTURED CROSS-LAMINATES OF UNIAXIALLY ORIENTED POLY-ALPHA-OLEFIN SHEETS AND THEIR MANUFACTURE
Ole-Bendt Rasmussen, Birkerod, Denmark, assignor, by mesne assignments, to Metal Containers Limited, Weybridge, Surrey, England
Filed Nov. 10, 1964, Ser. No. 410,211
Claims priority, application Great Britain, Nov. 12, 1963, 44,519/63
Int. Cl. B32b 3/10
U.S. Cl. 161—112                    4 Claims

ABSTRACT OF THE DISCLOSURE

Apertured cross-laminates of uniaxially oriented alpha-olefin polymer sheets are prepared by laminating uniaxially oriented sheets of alpha-olefin polymers (preferably high density polyethylene or isotactic polypropylene) in such a way that the direction of orientation of adjacent plies cross one another, slitting the laminate in a regular pattern which consists of parallel, closely spaced rows of slits with the slits in one row being transposed in relation to the slits of adjacent rows and then subjecting the laminate to lateral drawing to provide a reticular structure. The resulting structure has increased tear propagation resistance.

---

Figure 1:
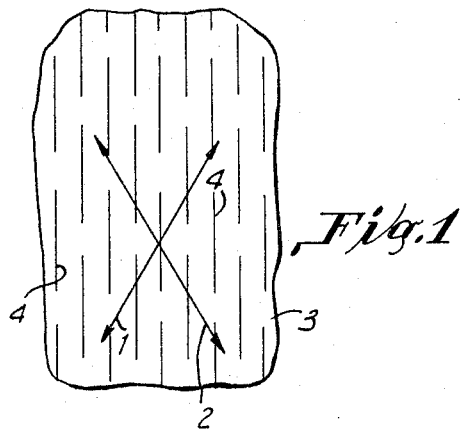

This invention relates to reticular structures made from polymers of α-olefines, particularly high density polyethylene and isotactic polypropylene, and to a method of manufacturing these structures.

Reticular structures of the said kind, as for instance fishing nets, are common articles of trade, because of the excellent wear properties, and the low price of the polymer material. The nets have hitherto been made from monofilaments or yarns by the usual net-making procedure, but this involves a drawback in that the knots uniting the filaments or yarns in the net structure are liable to slip owing to the said polymers having lower coefficients of friction than any other relatively cheap fibreforming polymer.

It has formerly been proposed to make nets from films of polymer material by providing the film with a multitude of holes arranged in a regular pattern, subsequently stretching the film in order to increase its strength, and in order to widen the holes to the size desired in the net. However, the strength of nets made in this manner has proved to be far below that of nets made in the usual manner from filaments or yarns.

It is further known that composite sheets, consisting of two or several films, which have been oriented by stretching, and laminated so that the directions of orientation of adjacent plies cross each other, exhibit a combination of tear propagation resistance and tensile strength in all directions.

In order to obtain the optimal combination of the said properties, the film material has to be selected among a limited group of polymers, including high density polyethylene and isotactic polypropylene.

When an incision is made in a composite sheet of the said kind, and attempts are made to tear the sheet from this incision, the different plies will tend to split in different directions, which means that the applied tearing forces will be scattered over a relatively large area. The result is that the tearing force at any single point will soon become too small for the tearing to continue. The tearing also results in a change in the direction of orientation of the individual plies, tending to stop further propagation of the tears.

It is an object of the present invention to utilize the said principle of imparting tear propagation resistance in the providing of reticular structures, as for example fishing nets, of a strength approximately equal to that of similar structures made from filaments and yarns.

With this object in view, a reticular structure according to the invention consists of a laminated sheet material made from an α-olefin polymer, in which sheet the individual plies are uniaxially oriented, the directions of orientation crossing each other, said laminated sheet being provided with a multitude of slits disposed in a regular pattern, substantially consisting of parallel, closely spaced rows of slits, the slits in one row being transposed in relation to the slits of adjacent rows, the slitted material being in a state of lateral extension perpendicularly to the slits.

In a preferred embodiment, the laminated sheet material consists of high density polyethylene or isotactic polypropylene. The said polymers may contain a plasticizer, for example polyisobutylene.

The preferred method of producing the reticular structure of the invention comprises cross-laminating uniaxially oriented films of an α-olefin polymer in such a way that the directions of orientation of adjacent plies cross each other, providing the cross-laminate with a multitude of slits in closely spaced rows in a regular pattern, the spaces between the slits in one row being substantially aligned with the middle of the slits in the adjacent rows, the slitted material being subjected to lateral drawing to terminate the tendency of further splitting at the ends of the slits.

In an alternative method, the slits are formed in the individual plies before uniting them to a cross-laminate.

In cross-laminating the sheet material, it is not necessary that the directions of orientation of adjacent plies are at right angles to one another. On the contrary, it is often advantageous that the angle between said directions of orientation is far below 90°, for example about 60°. The slits are preferably made so as not to follow the direction of orientation of any of the plies in the cross-laminate.

In order to obtain a high tear propagation resistance of the laminated material, the orienting of the plies to be laminated should be carried out by stretching at a relatively low temperature, in the case of the material being high density polyethylene preferably at about room temperature, and in the case of it being isotactic polypropylene, preferably about 40° C. The drawing out to a reticular structure, after the slits have been made, is preferably carried out at a somewhat higher temperature, for example at a temperature between 80 and 100° C. in order that the material may easier re-orient at the ends of the slits to prevent further tearing, and to increase the tensile strength.

The laminated sheet material may be manufactured in known manner by first producing tubular films, which are stretched lengthwise and cut up. The stretching produces orientation in the longitudinal direction, and butt cutting some of the tubes longitudinally and others helically, films with longitudinal and oblique directions of orientation, respectively, are obtained. Films with different directions of orientation are then laminated in known manner by welding or by application of an adhesive, or by a combination of these methods. In the adhesive uniting, polyisobutylene is, for example, suitable as an adhesive, especially polyisobutylene of an average molecular weight of about 15,000, or polyisobutylene of higher molecule weight to which a relatively small amount of paraffin wax have been admixed.

The slits can be cut, for example, by means of a roller, the surface of which is provided with a multitude of suitably arranged knives. Preferably, the slits are cut in the longitudinal direction of the cross-laminated material, the subsequent drawing out to form the reticular structure being carried out in any suitable manner, as by means of a usual tenter frame.

Figure 2:
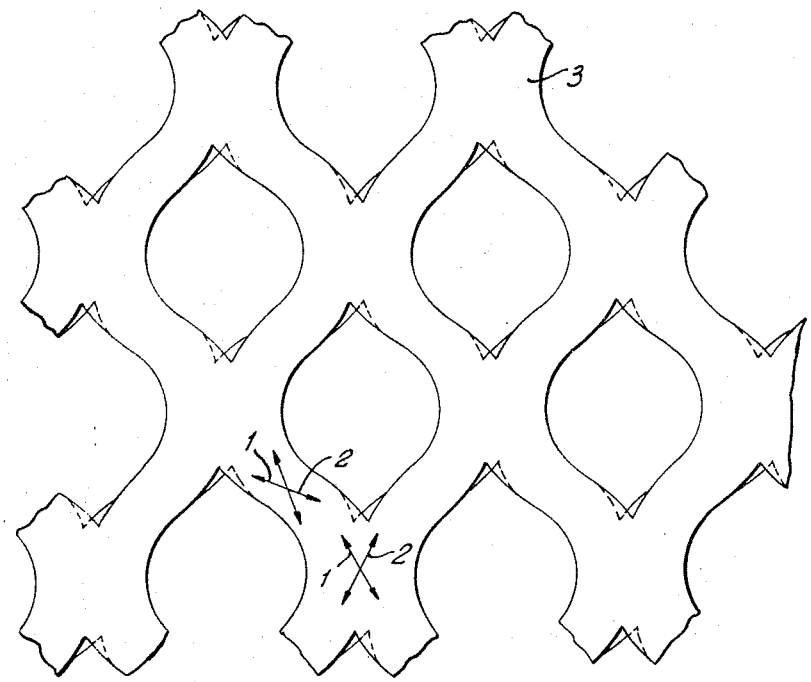

The reticular structure of the invention is further illustrated by the accompanying drawing, in which FIG. 1 is a plan view of a cross-laminate being provided with slits, and FIG. 2 on a larger scale shows the final reticular structure.

In FIG. 1, arrows 1 and 2 indicate the directions of orientation in two films, which are united to a laminate 3. The relatively thin lines represent a pattern of slits 4 which are made by incision in the laminate.

By laterally drawing out the laminate 3, the slits are opened as shown in FIG. 2. The drawing out tends initially to produce a tearing at the ends of the slits 4, but by the drawing, a re-orientation takes place here, terminating any tearing which may have started. Also, by the drawing out, the angle between the directions of orientation in the different plies tends to become smaller in the material between neighbouring slits than in the areas around the ends of the slits, which is advantageous as it improves the tensile strength of the reticular structure.

As already mentioned, the product of the invention is advantageously used for fishing nets. Other uses are, for example for packaging, for wind-screens, for tennis nets, or as a reinforcing material in the housebuilding industry.

I claim:

1. A reticular structure, consisting of a laminated sheet material made from high density polyethylene or isotactic polypropylene, in which the individual plies are uniaxially oriented, the directions of orientation crossing each other, said laminated sheet being provided with a multitude of slits disposed in a regular pattern substantially consisting of parallel, closely spaced rows of slits, the slits in one row being transposed in relation to the slits of adjacent rows, and the slitted material being in a state of lateral extension perpendicular to the slits.

2. A reticular structure according to claim 1, in which the laminated sheet material consists of high density polyethylene or isotactic propylene with an admixed plasticizer.

3. The method of producing a reticular structure according to claim 2, which consists in cross-laminating uniaxially oriented films of high density polyethylene or isotactic polypropylene, in such a way that the directions of orientation of adjacent plies cross one another, providing the cross-laminate with a multitude of slits in closely spaced rows in a regular pattern, the spaces between the slits in one row being substantially aligned with the middle of the slits in the adjacent rows, the slitted material being subjected to lateral drawing at 80 to 100° C.

4. The method of producing a reticular structure according to claim 1, which consists in cross-laminating uniaxially oriented films of high density polyethylene or isotactic polypropylene, in such a way that the directions of orientation of adjacent plies cross one another, providing the cross-laminate with a multitude of slits in closely spaced rows in a regular pattern, the spaces between the slits in one row being substantially aligned with the middle of the slits in the adjacent rows, the slitted material being subjected to lateral drawing at 80–100° C.

References Cited

UNITED STATES PATENTS

| | | | |
|---|---|---|---|
| 2,646,291 | 10/1953 | Doll et al. | |
| 3,040,968 | 6/1962 | Long et al. | 229—87 |
| 3,137,746 | 6/1964 | Seymour et al. | 264—73 |
| 3,322,613 | 5/1967 | Rasmussen | 161—402 X |

ROBERT F. BURNETT, *Primary Examiner.*

R. H. CRISS, *Assistant Examiner.*

U.S. Cl. X.R.

156—229, 253; 161—402